United States Patent [19]

Ishibashi

[11] Patent Number: 4,482,237
[45] Date of Patent: Nov. 13, 1984

[54] DEVICE FOR DETECTING STOP VALUE DATA FROM FLASH UNIT USED WITH CAMERA

[75] Inventor: Kenzo Ishibashi, Tokyo, Japan

[73] Assignee: Asahi Kogaku Kogyo Kabushiki Kaisha, Tokyo, Japan

[21] Appl. No.: 460,080

[22] Filed: Jan. 20, 1983

[30] Foreign Application Priority Data

Feb. 10, 1982 [JP] Japan .................. 57-18830

[51] Int. Cl.³ .............................. G03B 15/05
[52] U.S. Cl. .................... 354/416; 354/446
[58] Field of Search .................. 354/32–35, 354/43, 44, 60 F, 139, 149, 416–418, 422, 423, 446–454

[56] References Cited

U.S. PATENT DOCUMENTS 4,329,624  5/1982  Kamon et al. .............. 354/34 X

FOREIGN PATENT DOCUMENTS 2041552  9/1980  United Kingdom .............. 354/149

Primary Examiner—William B. Perkey
Attorney, Agent, or Firm—Browdy and Neimark

[57] ABSTRACT

In a flash unit used with camera for providing stop value data consisting of a frequency clock, a circuit which can detect stop value data consisting of a frequency clock or the like provided from the flash unit without being influenced by noise by permitting the stop value data to be accepted when the data is confirmed to be a continuous normal signal. Where the camera is provided with a TTL flash automatic light does control unit, the circuit permits the use of a common circuit for a path through which the detecting circuit receives the stop value data and for a path through which the TTL flash automatic light dose control unit provides automatic light dose control data to be flash unit, thus permitting simplification of these data transmitting system.

1 Claim, 4 Drawing Figures

DEVICE FOR DETECTING STOP VALUE DATA FROM FLASH UNIT USED WITH CAMERA

BACKGROUND OF THE INVENTION

1. Field of the Invention

This invention relates to a stop value data detecting device for a camera which can be used with a flash unit connected to it for providing stop value data consisting of a frequency clock and with an automatic stop control unit.

2. Description of the Prior Art

Japanese patent application No. 56-88,532 filed by the same applicant as of the instant application discloses the use of a pulse signal consisting of a frequency clock as stop value data generated from a flash unit. However, no circuit which can detect the stop value data noted above has yet been proposed.

SUMMARY OF THE INVENTION

An object of the present invention is to provide a circuit, which can detect stop value data consisting of a frequency clock or the like provided from the flash unit without being influenced by noise by permitting the stop value data to be accepted when the data is confirmed to be a continuous normal signal. Another object of the present invention is to provide a circuit for use in case where a TTL flash automatic light dose control unit is provided, which permits the use of a common circuit for a path through which the detecting circuit receives the stop value data and for a path through which the TTL flash automatic light dose control unit provides automatic light dose control data to the flash unit, thus permitting simplification of these data transmitting systems.

According to the present invention, the clock is supplied to an automatic stop control unit after a stop value detecting circuit confirms that the frequency clock which is provided as the stop value data from the flash unit consists of pulses greater in number than a predetermined number, whereby the possibility of transmission of such noise as one consisting of an insufficient number of pulses with respect to the aforementioned number to the automatic stop control unit is prevented. Further, in case of a camera provided with a TTL flash automatic light dose control circuit, an input/output selecting circuit transmits the stop value data from a flash unit to the stop value detecting circuit when there is no shutter release signal and also there is no light dose control signal from the TTL flash automatic light dose control circuit while when there is a shutter release signal and also a light dose control signal is produced from the TTL flash automatic light dose control circuit, it transmits the light dose control signal to the flash unit. Thus, it is possible to make common use of the input/output path of the flash unit and simplify the data transmitting system.

The above-mentioned and other objects and features of the invention will become apparent from the following detailed description taken in conjunction with the drawings which indicate an embodiment of the invention.

DETAILED DESCRIPTION OF THE PREFERRED EMBODIMENTS

Figure 1:
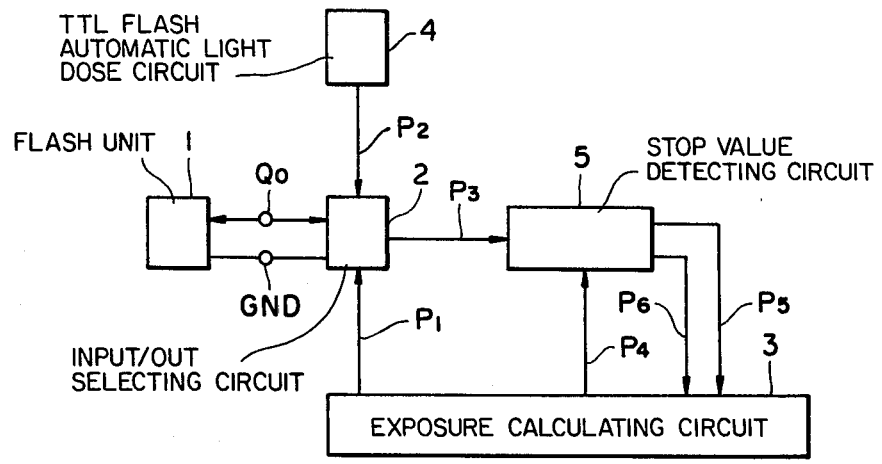
FIG. 1 is a block diagram showing an embodiment of the present invention.

FIG. 1 shows the construction of the embodiment. A flash unit 1 is connected to an input/output selecting circuit 2 through a zero potential terminal GND and also through a signal potential terminal $Q_0$. The flash unit 1 can provide stop value data consisting of a frequency clock and is also capable of light dose control by a TTL automatic light dose control unit. The input/output selecting circuit 2 receives a signal $P_1$, which is provided from an exposure calculating circuit 3 constituting an automatic stop control and is capable of assuming a high (H) level or a low (L) level, and a signal $P_2$, which is provided from a TTL flash automatic light dose control circuit 4 and is capable of assuming a high (H) level or a low (L) level. The input/output selecting circuit 2 provides an output signal $P_3$ which is given to a stop value detecting circuit 5. In the absence of a shutter release signal (not shown) to the exposure calculating circuit 3, the signal $P_1$ is at the "H" level. At this time, the input/output selecting circuit 2 is receiving a pulse signal consisting of a frequency clock provided as stop value data from the flash unit 1 to a terminal $Q_0$ and providing this signal as its output signal $P_3$ to the stop value detecting circuit 5. When the signal $P_1$ goes to the "L" level in response to a shutter release signal and also the signal $P_2$ goes to the "L" level with the increase of the dose of light from the flash unit 1 detected by the TTL flash automatic light dose control circuit 4 beyond a predetermined level, the input/output selecting circuit 2 supplies to the flash unit 1, a light dose control signal represented by the signal $P_2$ from the TTL flash automatic light dose control circuit 4. The stop value detecting circuit 5 is controlled by a signal $P_4$, which is provided from the exposure calculating circuit 3 and can assume either "H" level or "L" level. The exposure calculating circuit 3 calculates pulses of the signal $P_3$ for each period T during which the signal $P_4$ is periodically at the "H" level. When a predetermined number of pulses is reached, the circuit 5 confirms this to be the continuously generated normal stop value data. At this time, the circuit 5 supplies a stop value data confirmation signal $P_5$ and a frequency signal $P_6$ which is stop value data received as the signal $P_3$ to the exposure calculating circuit 5. The exposure calculating circuit 3 effects exposure calculation according to the signals $P_5$ and $P_6$.

Figure 2:
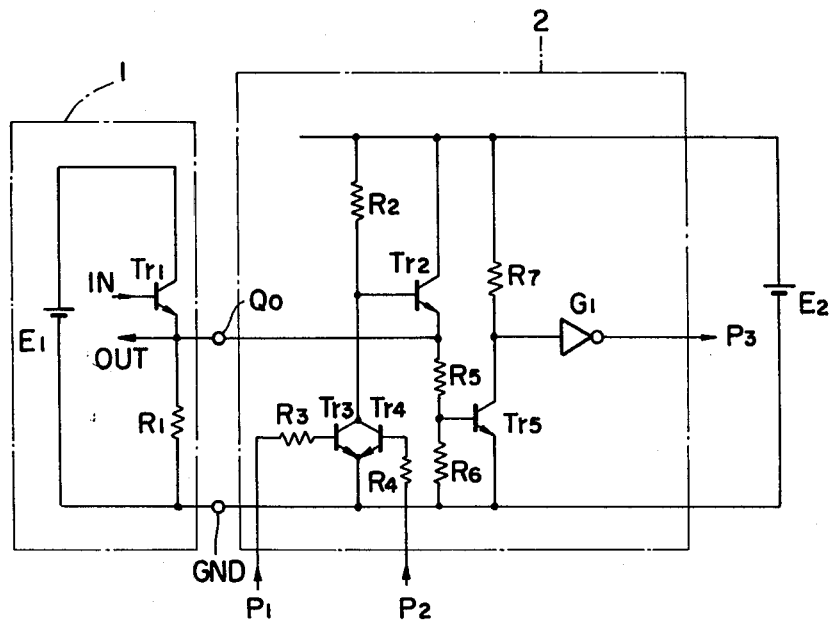
FIG. 2 is a circuit diagram showing a specific example of the construction of the flash unit and input/output selecting circuit.
Figure 3:
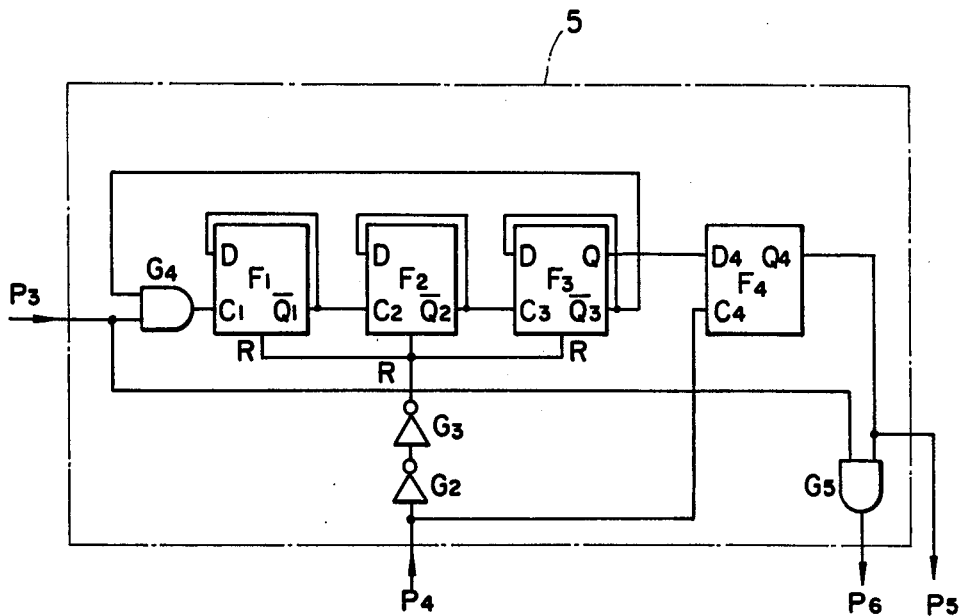
FIG. 3 is a specific example of a stop value detecting circuit.

A detailed example of the construction of the input/output selecting circuit 2, flash unit 1 and stop value detecting circuit 5, these constituting the essential parts of the circuit of FIG. 1, will now be described with reference to FIGS. 2 and 3. Referring to FIG. 2, designated at $E_1$ is a power supply for the control of the flash unit 1. It also serves as a power supply for charging a flashlight bulb (not shown). A transistor $Tr_1$ has its collector connected to the plus side of the power supply $E_1$ and its emitter connected to through a load resistor $R_1$ to the minus side of the power supply. The base of the transistor $Tr_1$ constitutes an input terminal IN, to which stop value data consisting of a frequence clock is supplied. The data noted above is transmitted to a terminal $Q_0$ which is connected to the emitter of the transistor $Tr_1$. Au automatic light dose control signal based on the signal $P_2$ from the input/output selecting circuit 2, is supplied from the input/output selecting circuit 2 through an output terminal OUT, which is connected to the emitter of the transistor $Tr_1$, for controlling the stopping of the flashing of a flashing element (not shown) in the flash unit 1. A transistor $Tr_1$ has its collector connected to the plus side of a power supply $E_2$ for the control of camera and its base connected through a resistor $R_2$ to the plus side of the power supply $E_2$. The base is also connected through transistors $Tr_3$ and $Tr_4$ in parallel with each other to the minus side of the power supply $E_2$. The transistor $Tr_2$ is "on" when the transistors $Tr_3$ and $Tr_4$ are both "off" and is "off" when either one of the transistors $Tr_3$ and $Tr_4$ is "on". The transistor $Tr_3$ is turned on when the signal $P_1$ fed through the resistor $R_3$ goes to the "H" level. The transistor $Tr_4$ is turned on when the signal $P_2$ fed through the resistor $R_4$ goes to the "H" level. The emitter of the transistor $Tr_2$ is connected to the terminal $Q_0$ and is also connected through resistors $R_5$ and $R_6$ to the minus side of the power supply $E_2$. When the signal $P_1$ supplied to the transistor $Tr_3$ goes to the "L" level, the transistor $Tr_3$ is turned off. At this time, the signal $P_2$ received by the transistor $Tr_4$ either turns on or off the transistor $Tr_4$, thus inverting the signal $P_2$ sent out to the output terminal OUT. The transistor $Tr_5$ has its collector connected to a load resistor $R_7$ to the minus side of the power source $E_2$ and its emitter connected to the minus side of the power supply. The base of the transistor $Tr_5$ receives a potential, which is obtained by dividing the potential $V_{Q0}$ at the terminal $Q_0$ between the resistors $R_5$ and $R_6$. The output signal $P_3$ is supplied from the collector of the transistor $Tr_5$ through the inverter $G_1$ to the stop value detecting circuit 5. The condition to be met for the signal $P_3$ to be at the "H" level is given as $$V_{Q0} > \frac{R_5 + R_6}{R_5} V_{BE}$$

where $V_{BE}$ is the threshold value of the base potential for the transistor $Tr_5$ to be turned on so that "L" level is provided from the collector thereof. The resistances of the resistors $R_5$ and $R_6$ are determined such as to meet the inequality noted above; more particularly, these values are set such that the inequality be satisfied irrespective of the fluctuations of the potential $V_{BE}$ due to changes in temperature of the transistor $Tr_5$ or irrespective of the fluctuations of the potential $V_{Q0}$ due to fluctuations of the voltages of the power supplies $E_1$ and $E_2$. As for the signal $P_3$, a signal provided when and only when the transistor $Tr_2$ is "off", i.e., a signal provided according to the stop value data IN, is used, and the signal provided through the transistor $Tr_2$ on the bais of the light dose signal $P_2$ is not used, as will be described hereinafter in detail. Referring to FIG. 3, D-type flip-flops $F_1$, $F_2$ and $F_3$ constitute a counter. The signal $P_4$ from the exposure calculating circuit 3 is coupled through delay circuits $G_2$ and $G_3$ to the reset terminals R of flip-flops $F_1$, $F_2$ $F_3$. An output signal provided from an AND gate $G_4$ is fed to the gate terminal $C_1$ of the D-type flip-flop $F_1$. The negation output terminal $\bar{Q}_1$ is connected to the gate terminal $C_2$ of the D-type flip-flop $F_2$, the negation output terminal $\bar{Q}_2$ is in turn fed to the gate terminal $C_3$ of the D-type flip-flop $F_3$, and the negation output terminal $\bar{Q}_3$ is connected to the other input terminal of the AND gate $G_4$. The AND gate $G_4$ receives at its input terminal noted before the output signal $P_3$ from the input/output selecting circuit 2. In each D-type flip-flop its negation output terminal $\bar{Q}$ and data input terminal D are connected to each other. The three flip-flops $F_1$, $F_2$ and $F_3$ which are connected in cascade are reset by the signal $P_4$. When four pulses are provided as the signal $P_3$ after the resetting of the flip-flops, the output from the affirmation output terminal Q of the last stage D-type flip-flop $F_3$ goes to the "H" level, this signal being fed to the data input terminal $D_4$ of a following stage D-type flip-flop $F_4$. The signal $P_4$ is supplied to the gate terminal $C_4$ of the D-type flip-flop $F_4$. When this signal $P_4$ goes to the "H" level, the output from the affirmation output terminal $Q_4$ goes to the "H" level due to the "H" level signal to the input terminal $D_4$ noted above. At this time, it is confirmed that the signal $P_3$ is the normal frequency signal. A confirmation signal $P_5$ which is produced at this time is supplied to the exposure calculating circuit 3 and also to an AND gate $G_5$. The AND gate $G_5$ thus passes the signal $P_3$ fed to its other input terminal as the frequency signal $P_5$ to the exposure calculating circuit 3. When the exposure calculating circuit 3 receives the release signal, it inverts the signal $P_4$ to the "L" level while blocking the signals $P_5$ and $P_6$.

The operation of the above construction will now be described.

Figure 4:
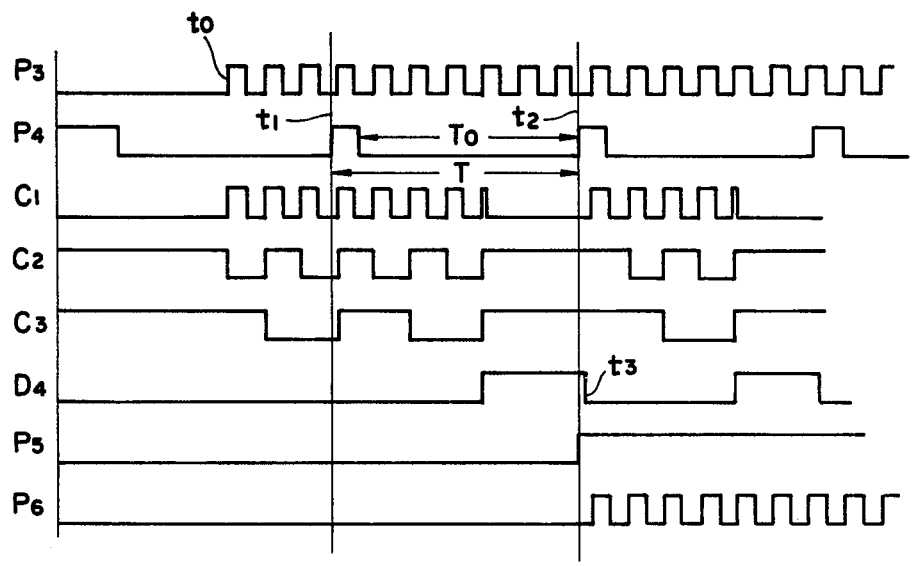
FIG. 4 is a timing chart for explaining the operation of the stop value detecting circuit.

In the light measuring operation, as soon as charging is completed, stop value data which consists of a frequency clock is supplied to the input terminal IN of the flash unit 1, i.e., the base of the transistor $Tr_1$. At this time, the signal $P_1$ of the exposure calculating circuit 3 is at the "H" level since no release signal is received. Thus, the transistor $Tr_3$ is "on", while the transistor $Tr_2$ is "off". The frequency clock as the stop value data noted above is thus transmitted to the terminal $Q_0$ with the action of the transistor $Tr_1$. The frequency clock operates the transistor $Tr_5$, and the signal $P_3$ is supplied to the AND gate $G_3$ after the instant $t_0$ of completion of charging as shown in FIG. 4. The exposure calculating circuit 3 is accepting the signals $P_5$ and $P_6$ while it is providing a timing pulse signal with a period T as shown in FIG. 4 to the stop value detecting circuit 5. If the signal $P_4$ is at the "L" level at the instant $t_0$, the D-type flip-flops $F_1$, $F_2$ and $F_3$ are in the reset state after having been set once. The negation output terminal $\bar{Q}_3$ of the flip-flop $F_3$ is this at the "H" level. Thus, the signal $P_3$ is passed through the AND gate $G_4$ to the gate terminal $C_1$ of the flip-flop $F_1$. The flip-flops $F_1$, $F_2$ and $F_3$ which constitute a counter are repeating a counting operation such that with the second rising of the signal $P_3$ at the gate terminal $C_1$ a rising signal is fed to the gate terminal $C_2$ of the flip-flop $F_2$ and likewise with the second rising of the signal at the gate terminal $C_2$ a rising signal is fed to the gate terminal $C_3$ of the flip-flop $F_3$. When the signal $P_4$ goes to the "H" level at an instant $t_1$, the individual flip-flops $F_1$, $F_2$ and $F_3$ are reset, and when the resetting is subsequently released with the inversion of the signal $P_4$ to the "L" level, the flip-flops $F_1$, $F_2$ and $F_3$ start counting afresh. The counting in the individual state flip-flops proceeds with the second rising of the input to the gate terminal in the preceding stage flip-flops. With the fourth rising of the signal $P_3$, the output of the affirmation output terminal Q of the flip-flop $F_3$ is thus inverted to the "H" level. The "H" level signal is fed to the data input terminal $D_4$ of the D-type flip-flop $F_4$. As a result, the output of the negation output terminal $\overline{Q}_3$ of the flip-flop $F_3$ is inverted to the "L" level, thus causing the AND gate $G_4$ to pass the signal $P_3$. When the signal $P_4$ goes to the "H" level at an instant $t_2$, the output of the affirmation output terminal $Q_4$ of the flip-flop $F_4$ goes to the "H" level. This signal supplied as the confirmation signal $P_5$ to the exposure calculating circuit 3. The signal $P_4$ is delayed a slight delay time through the delay circuits $G_2$ and $G_3$ before it is coupled to the flip-flops $F_1$, $F_2$ and $F_3$ for resetting these flip-flops at an instant $t_3$. Since the affirmation output terminal $Q_4$ of the flip-flops at an instant $t_3$. Since the affirmation output terminal $Q_4$ of the flip-flop $F_4$ is at the "H" level, the signal $P_3$ is subsequently passed through the AND gate $G_5$ to be fed as the frequency signal $P_6$ to the exposure calculating circuit 3. While the signal $P_3$ continues to prevail, the signals $P_5$ and $P_6$ are not changed. This is so because always four or more pulses are generated as the signal $P_3$ during a period $T_0$ shown in FIG. 4 so that the data input terminal $D_4$ of the flop-flop $F_4$ is always at the "H" level before the rising of the signal $P_4$. Since the confirmation signal $P_5$ is at the "H" level, the exposure calculating circuit 3 accepts the frequency signal $P_6$ as the normal signal.

With the appearance of a release signal not shown, the exposure operation of the camera is started. First, the exposure calculating circuit 3 executes calculations necessary for the exposure. At the same time, the circuit 3 renders the signal $P_1$ to be at the "L" level and also renders the signal $P_4$ to be at the "L" level while blocking the signals $P_5$ and $P_6$. When the camera shutter is subsequently fully opened, the flash unit 1 is caused to produce flashlight with the closure of a switch (not shown). At this time, the automatic light dose control signal $P_2$ is at the "H" level, that is, the transistor $Tr_4$ is "on" while the transistor $Tr_2$ is "off". When the TTL flash automatic light dose control circuit 4 detects a predetermined light dose level, the signal $P_2$ goes to the "L" level to turn off the transistor $Tr_4$. The transistor $Tr_3$ at this time remains "off" since the signal $P_1$ is at the "L" level. Thus, the transistor $Tr_2$ is turned on so that a flashing stop signal is provided to the output terminal OUT. The flash unit 1 stops flashing in response to the flashing stop signal. While the signal $P_3$ is generated with the action of the transistor $Tr_2$, this gives rise to no trouble in the operation of the camera for the signals $P_5$ and $P_6$ are blocked. These also arises a situation, in which the output of the transistor $Tr_1$ and the output of the transistor $Tr_2$ appear simultaneously at the terminal $Q_0$ during a period from the instant when the signal $P_1$ is inverted from the "H" level to the "L" level with the generation of the release signal till the flashing of the flash unit 1. This again gives rise to no trouble for the transistor $Tr_2$ is "on" at this time.

As has been described in the foregoing, according to the present invention stop value data is counted for a fixed period of time and the exposure calculating section is adapted to accept the count when and only when the count is confirmed to be the normal signal. Thus, there is no possibility of accepting noise, nor there is any possibility for the stop value data to be adversely affected by the fluctuations of the power supplies for the flash unit and camera. Further, since an input/output selecting circuit is provided, the stop value data and TTL automatic light dose control signal can be transmitted through a single terminal, so that it is possible to simplify the connection between the camera and flash unit.

What is claimed is:

1. In a camera which can be used with a flash unit connected to it for providing stop value data consisting of a frequency clock for controlling exposure according to said stop value data, a device for detecting stop value data from flash unit comprising a stop value detecting circuit for counting said frequency clock in a predetermined period of time and transmitting said frequency clock to an automatic stop control unit when the count reaches a predetermined value, and an input/output selecting circuit provided on the side of said stop value detecting circuit to which the stop value data from the flash unit is supplied and connected to a flash automatic light dose control circuit, said input/output selecting circuit transmitting said stop value data to said stop value detecting circuit when there is no shutter release signal while transmitting a light dose control signal from said flash automatic light dose control circuit to said flash unit when there is a shutter release signal.

* * * * *